United States Patent
Meng et al.

(10) Patent No.: US 9,797,716 B2
(45) Date of Patent: Oct. 24, 2017

(54) ESTIMATING SURFACE PROPERTIES USING A PLENOPTIC CAMERA

(71) Applicants: Lingfei Meng, Redwood City, CA (US); Liyang Lu, Houston, TX (US); Kathrin Berkner, Los Altos, CA (US); Ivana Tosic, Berkeley, CA (US)

(72) Inventors: Lingfei Meng, Redwood City, CA (US); Liyang Lu, Houston, TX (US); Kathrin Berkner, Los Altos, CA (US); Ivana Tosic, Berkeley, CA (US)

(73) Assignee: Ricoh Company, Ltd., Tokyo (JP)

( * ) Notice: Subject to any disclaimer, the term of this patent is extended or adjusted under 35 U.S.C. 154(b) by 142 days.

(21) Appl. No.: 14/594,017

(22) Filed: Jan. 9, 2015

(65) Prior Publication Data
US 2016/0202048 A1    Jul. 14, 2016

(51) Int. Cl.
*H04N 7/18* (2006.01)
*G01B 11/25* (2006.01)
(Continued)

(52) U.S. Cl.
CPC .............. *G01B 11/25* (2013.01); *G01B 11/24* (2013.01); *G01B 11/303* (2013.01); *G06T 7/557* (2017.01);
(Continued)

(58) Field of Classification Search
IPC ..................................................... G01B 11/25
See application file for complete search history.

(56) References Cited

U.S. PATENT DOCUMENTS 5,313,542 A    5/1994    Castonguay
5,825,666 A *  10/1998   Freifeld ............... G01B 11/005
                                                              279/128

(Continued)

FOREIGN PATENT DOCUMENTS

JP    H08-501880 A    2/1996
JP    2000-509150 B4  7/2000
(Continued)

OTHER PUBLICATIONS

Goldman, D. B. et al., "Shape and Spatially-Varying BRDFs from Photometric Stereo," IEEE Transactions on Pattern Analysis and Machine Intelligence, 2010, pp. 1060-1071, vol. 32, No. 6.

(Continued)

*Primary Examiner* — Tracy Y Li
(74) *Attorney, Agent, or Firm* — Fenwick & West LLP (57) ABSTRACT

A plenoptic camera captures a plenoptic image of an object illuminated by a point source (preferably, collimated illumination). The plenoptic image is a sampling of the four-dimensional light field reflected from the object. The plenoptic image is made up of superpixels, each of which is made up of subpixels. Each superpixel captures light from a certain region of the object (i.e., a range of x,y spatial locations) and the subpixels within a superpixel capture light propagating within a certain range of directions (i.e., a range of u,v spatial directions). Accordingly, optical properties estimation, surface normal reconstruction, depth estimation, and three-dimensional rendering can be provided by processing only a single plenoptic image. In one approach, the plenoptic image is used to estimate the bidirectional reflectance distribution function (BRDF) of the object surface.

20 Claims, 7 Drawing Sheets

(51) Int. Cl.
*G06T 7/60* (2017.01)
*H04N 5/225* (2006.01)
*H04N 13/02* (2006.01)
*G01B 11/30* (2006.01)
*G01B 11/24* (2006.01)
*G06T 7/557* (2017.01)

(52) U.S. Cl.
CPC ............. *G06T 7/60* (2013.01); *H04N 5/2256* (2013.01); *H04N 13/0232* (2013.01)

(56) References Cited

U.S. PATENT DOCUMENTS

| | | | |
|---|---|---|---|
| 6,028,955 A * | 2/2000 | Cohen | G06T 15/06 382/154 |
| 9,153,026 B2 | 10/2015 | Meng et al. | |
| 9,270,902 B2 | 2/2016 | Watanabe et al. | |
| 2008/0130005 A1* | 6/2008 | Waslowski | G01C 3/085 356/446 |
| 2009/0303247 A1* | 12/2009 | Zhang | G06T 15/20 345/594 |
| 2010/0265385 A1 | 10/2010 | Knight et al. | |
| 2012/0056994 A1 | 3/2012 | Fyffe | |
| 2013/0222555 A1* | 8/2013 | Nagasaka | H04N 13/021 348/50 |
| 2014/0204183 A1 | 7/2014 | Lee et al. | |
| 2016/0153903 A1 | 6/2016 | Ono | |

FOREIGN PATENT DOCUMENTS

| | | |
|---|---|---|
| JP | 2010-054320 A | 3/2010 |
| JP | 2011-085521 A | 4/2011 |
| JP | 2013-047658 A | 3/2013 |
| JP | 2013-083571 A | 5/2013 |
| JP | 2014-086968 A | 5/2014 |
| JP | 2014-197824 A | 10/2014 |
| JP | 2015-049079 A | 3/2015 |

OTHER PUBLICATIONS

Hertzmann, A. et al., "Example-Based Photometric Stereo: Shape Reconstruction with General, Varying BRDFs," IEEE Transactions on Pattern Analysis and Machine Intelligence, Aug. 2005, pp. 1254-1264, vol. 27, No. 8.

U.S. Appl. No. 61/170,620, "Light Field Camera Image, File and Configuration Data, and Method of Using, Storing and Communicating Same," Inventors: T. Knight et al., filed Apr. 18, 2009, [Copy Not Enclosed].

Japanese Office Action, Japanese Application No. 2016-001845, Jan. 17, 2017, 4 pages (with concise explanation of relevance).

Narita, D., "Measurement of Three-dimensional Shape and Estimation of Surface Reflectance of a Columnar Object by Laser Rangefinder", Transactions of the Society of Instrument and Control Engineers, The Society of Instrument and Control Engineers, Feb. 29, 2008, pp. 115-123, vol. 44, No. 2 (with English abstract).

Masuda, K., Multispectral Technology for which Further Development is Expected, The Journal of the Institute of Image Information and Television Engineers, The Institute of Image Information and Television Engineers, The Institute of Image Information and Television Engineers, 2014, vol. 68, No. 4, pp. 281-294 (with concise explanation of relevance).

Kawamura, T., Measurement of Radiant Intensity Distribution of a Light Source by Using Diffuse Reflecting Board, IPSJ SIG Technical Reports Jun. 2012 Information Processing Society of Japan (IPSJ), 2013, pp. 1-5, vol. 2013-CVIM-186, No. 7 (with concise explanation of relevance).

Japanese Office Action, Japanese Application No. 2016-001845, Aug. 8, 2017 8 pages. (with concise explanation of relevance).

* cited by examiner

ESTIMATING SURFACE PROPERTIES USING A PLENOPTIC CAMERA

BACKGROUND

1. Field of the Invention

This technology relates generally to estimating surface properties of an object from a plenoptic image of the object.

2. Description of the Related Art

Photometric stereo is a technique in computer vision for estimating the surface normals and three-dimensional structure of an object by observing the reflected light under different illumination angles. In conventional photometric stereo, multiple images of the object are captured sequentially in time using different illumination conditions. The object's surface is commonly assumed to be Lambertian (i.e., a perfect diffusive reflector). In reality, many objects are not Lambertian and have some specular reflection. Estimating surface properties for a specular surface or a surface without any texture is still a challenging problem in the field of photometric stereo. Some recent techniques attempt to address the problem of specular reflection. However, a large number of image acquisitions are required. This is time-consuming, requires more complex hardware, and is difficult to apply to video (for example, for moving objects).

Thus, there is a need for better approaches to estimate surface properties of an object.

SUMMARY

Various embodiments overcome the limitations of the prior art by using a plenoptic camera to capture a plenoptic image of an object illuminated by a point source (preferably, collimated illumination). The plenoptic image is a sampling of the four-dimensional light field reflected from the object. The plenoptic image is made up of superpixels, each of which is made up of subpixels. Each superpixel captures light from a certain region of the object (i.e., a range of x,y spatial locations) and the subpixels within a superpixel capture light propagating within a certain range of directions (i.e., a range of u,v spatial directions). Accordingly, optical properties estimation, surface normal reconstruction, depth/height estimation, and three-dimensional rendering can be provided by processing only a single plenoptic image. In one approach, the plenoptic image is used to estimate the bidirectional reflectance distribution function (BRDF) of the object surface.

In addition, multiple plenoptic images can be captured using different illuminations in order to improve the estimation. Alternately, because surface properties can be estimated from a single plenoptic image, these techniques can also be applied to video with frames of plenoptic images.

Other aspects include components, devices, systems, improvements, methods, processes, applications and other technologies related to the foregoing.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The technology disclosed has other advantages and features which will be more readily apparent from the following detailed description and the appended claims, when taken in conjunction with the accompanying drawings, in which:

The figures depict embodiments for purposes of illustration only. One skilled in the art will readily recognize from the following discussion that alternative embodiments of the structures and methods illustrated herein may be employed without departing from the principles described herein.

DETAILED DESCRIPTION OF THE PREFERRED EMBODIMENTS

The figures and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Figure 1:
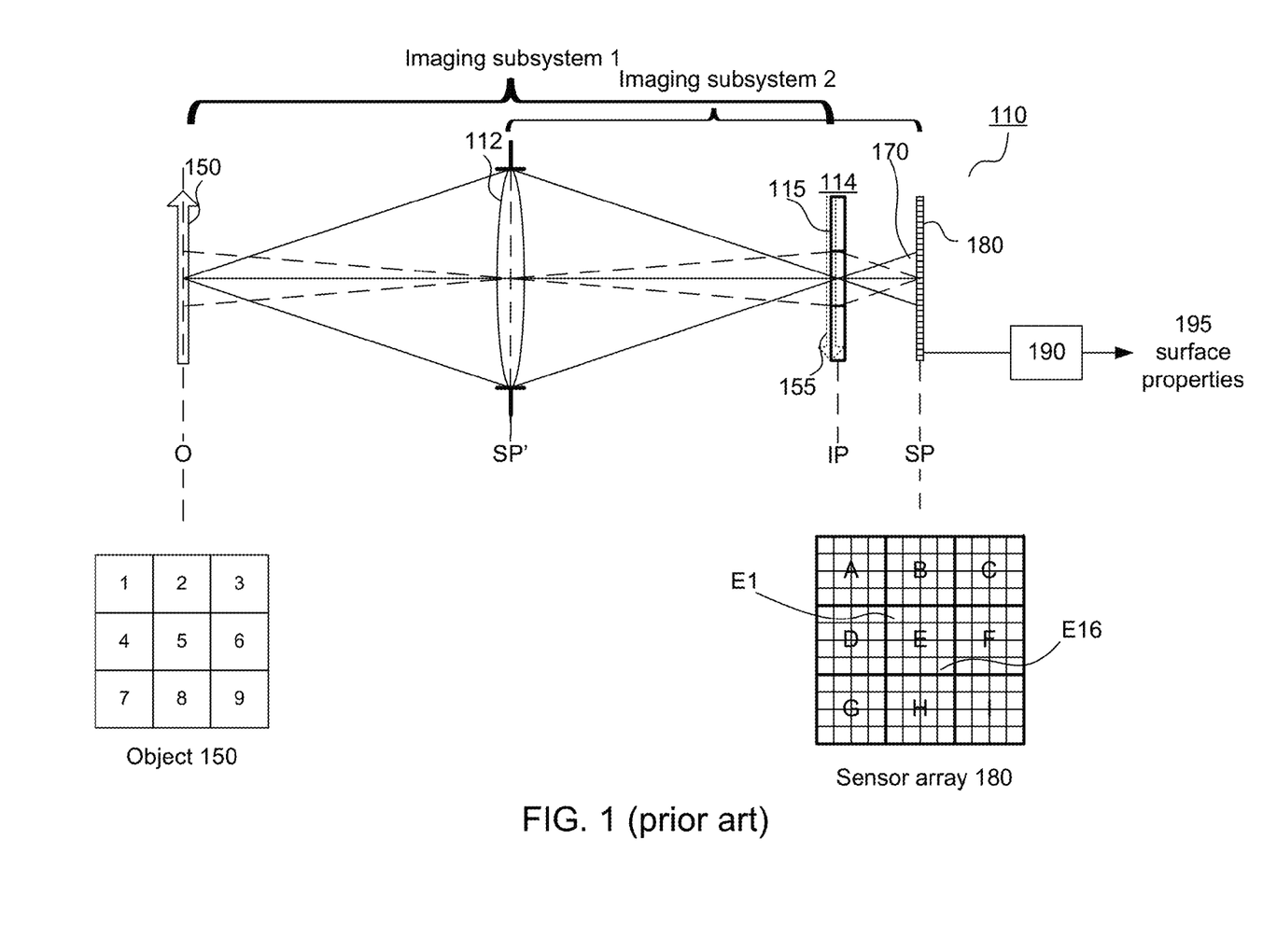
FIG. 1 (prior art) is a diagram illustrating a plenoptic imaging system.

FIG. 1 (prior art) is a diagram illustrating an example of a plenoptic imaging system. The plenoptic imaging system 110 includes primary imaging optics 112 (represented by a single lens in FIG. 1), a secondary imaging array 114 (an array of image forming elements 115) and a sensor array 180. The secondary imaging array 114 may be referred to as a microimaging array. The secondary imaging array 114 and sensor array 180 together may be referred to as a plenoptic sensor module. These components form two overlapping imaging subsystems, shown as subsystem 1 and subsystem 2 in FIG. 1.

For convenience, the imaging optics 112 is depicted in FIG. 1 as a single objective lens, but it should be understood that it could contain multiple elements. The objective lens 112 forms an optical image 155 of the object 150 at an image plane IP. The microimaging array 114 is located at the image plane IP, and each microlens images the aperture of imaging subsystem 1 onto the sensor array 180. That is, the aperture and sensor array are located at conjugate planes SP and SP'. Examples of microimaging arrays 114 include microlens arrays, arrays of pinholes, micromirror arrays, checkerboard grids and waveguide/channel arrays. The microimaging array 114 can be a rectangular array, hexagonal array or other types of arrays. The sensor array 180 is also shown in FIG. 1.

The bottom portion of FIG. 1 provides more detail. In this example, the microimaging array 115 is a 3×3 array of square microlenses. The object 150 is divided into a corresponding 3×3 array of regions, which are labeled 1-9. Each of the regions 1-9 is imaged by the objective lens 112 onto one of the microlenses 114. The dashed rays in FIG. 1 show imaging of region 5 onto the corresponding central microlens.

Each microlens images these rays onto a corresponding section of the sensor array 180. The sensor array 180 is shown as a 12×12 rectangular array. The sensor array 180 can be subdivided into superpixels, labelled A-I, with each superpixel corresponding to one of the microlenses and therefore also corresponding to a certain region of the object 150. In FIG. 1, superpixel E corresponds to the central microlens, which corresponds to region 5 of the object. That is, the sensors within superpixel E capture light from region 5 of the object.

Each superpixel is subdivided into subpixels. In this example, each superpixel has a 4×4 array of subpixels. Each subpixel within a superpixel captures light from the same region of the object, but at different propagation angles. For example, the upper left subpixel E1 in superpixel E captures light from region 5, as does the lower right subpixel E16 in superpixel E. However, the two subpixels capture light propagating in different directions from the object. This can be seen from the solid rays in FIG. 1. All three solid rays originate from the same object point but are captured by different subpixels. That is because each solid ray propagates along a different direction from the object.

In other words, the object 150 generates a four-dimensional light field L(x,y,u,v), where L is the amplitude, intensity or other measure of a ray originating from spatial location (x,y) propagating in direction (u,v). Each subpixel in the sensor array captures light from a certain volume of the four-dimensional light field. The subpixels are sampling the four-dimensional light field.

In certain plenoptic imaging system designs, the sample volumes are hypercubes. That is, every sensor within a superpixel captures light from the same rectangular (x,y) region, and each subpixel within the superpixel captures light from a rectangular (u,v) region. However, this is not always the case. For convenience, the superpixels will be described as capturing light from a certain region of the object (even though subpixels within that superpixel may capture light from slightly different regions), and the subpixels will be described as capturing light from a certain range of propagation directions (even though the range may be different for different subpixels, or even for different (x,y) points captured by the same subpixel). Regardless of the details, the plenoptic imaging system creates a plenoptic image 170, which maps (x,y) spatial locations and (u,v) propagation directions to sensors in the array 180. This is in contrast to a conventional image, which maps (x,y) spatial locations to sensors but loses information about the (u,v) propagation directions.

Because the plenoptic image 170 contains information about the four-dimensional light field produced by the object, under certain illumination conditions, it can be processed by processing module 190 to estimate surface properties 195 of the object, such as surface normals, specular reflection, diffuse reflection and surface roughness.

Figure 2A:
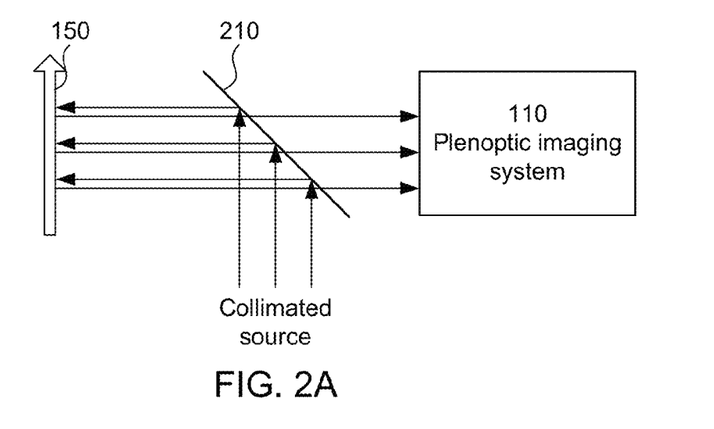
FIGS. 2A-2C are diagrams illustrating on-axis and off-axis illumination by a collimated source.
Figure 2B:
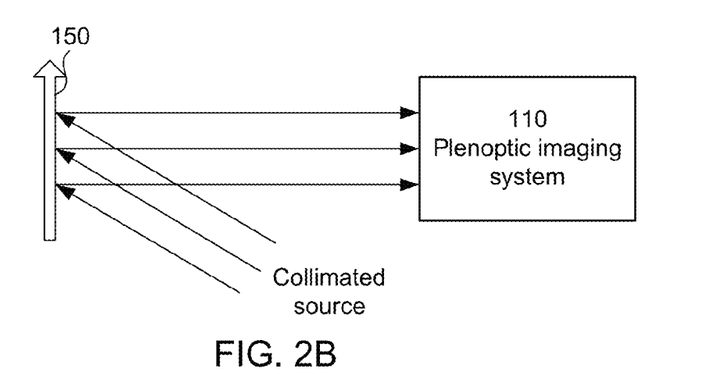
Figure 2C:
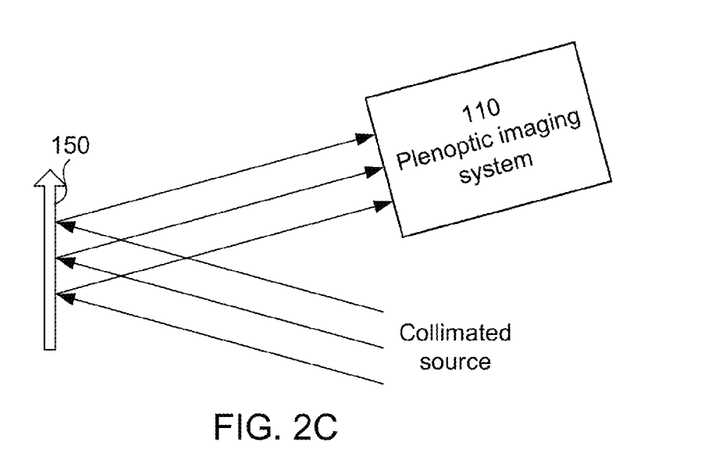

FIGS. 2A-2C show examples of special illumination. In these examples, the object is illuminated by a collimated source. In FIG. 2A, a beamsplitter 210 is used so that the illumination is on-axis or normal to the object. In FIGS. 2B-2C, the collimated illumination is off-axis. A collimated source (i.e., point source at infinity) is just one example. Other point sources may also be used.

Figure 3A:
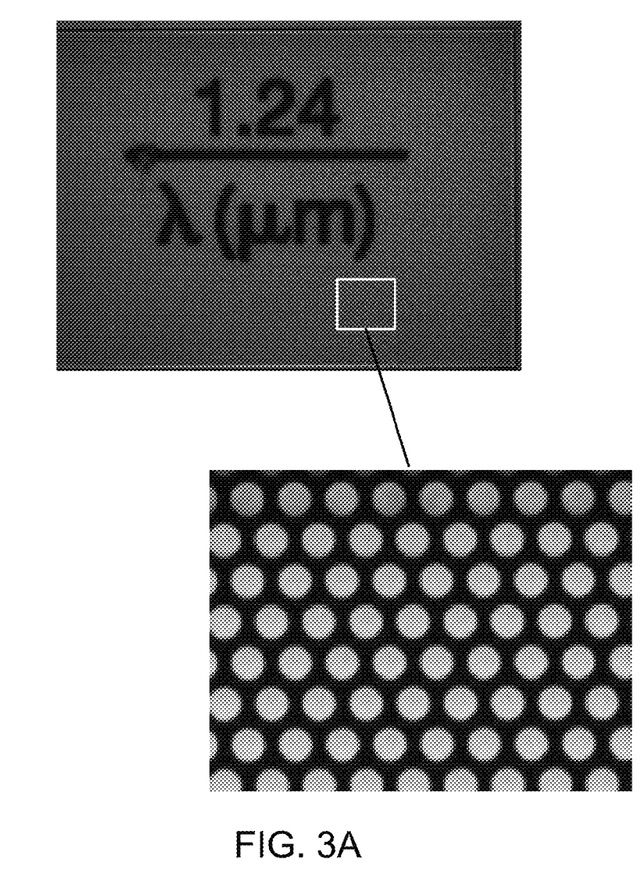
FIG. 3A is a raw plenoptic image of an object illuminated by room light.
Figure 3B:
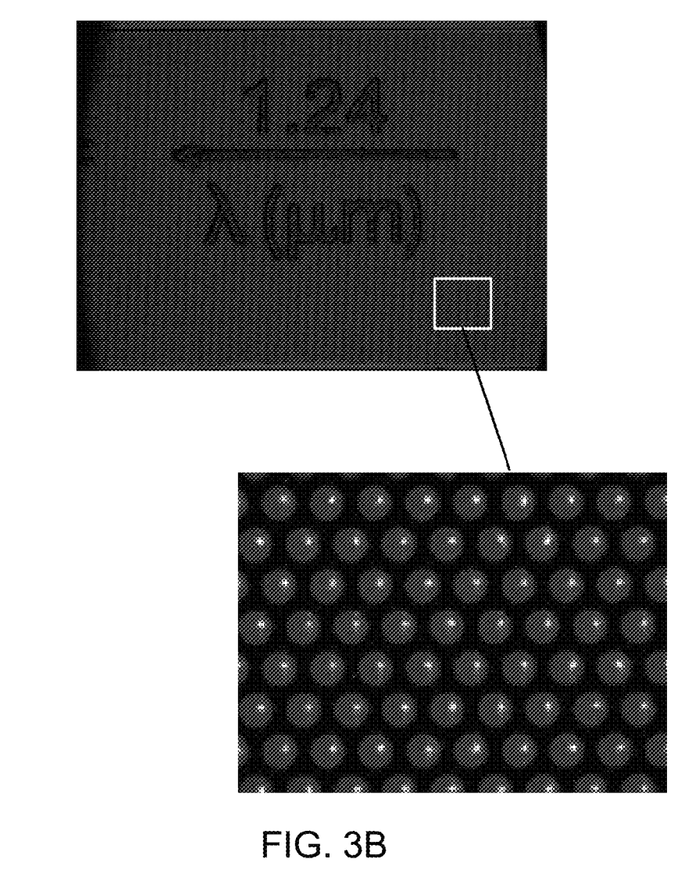
FIG. 3B is a raw plenoptic image of the same objected illuminated by a collimated source.

FIGS. 3A-3B are photographs illustrating the difference resulting from point source illumination. FIG. 3A shows a raw plenoptic image of an object illuminated by regular room lighting. The bottom image is a magnification of the area within the rectangle in the top image. Each circle in the bottom image is a separate superpixel. The superpixels are round because the main objective lens has a round aperture. Note that the superpixels are fairly uniformly illuminated. In contrast, FIG. 3B shows the raw plenoptic image of an object illuminated by a collimated source. Again, the bottom image is a magnification of the area within the rectangle in the top image. Each superpixel has a bright spot caused by the specular reflection of the collimated illumination. This is an important cue for surface normals and three-dimensional reconstruction, as described below.

One advantage of collimated illumination is that each point of the object is illuminated by light from a single known direction. Thus, the reflected light is a good indicator of the surface properties of the object. It is not "smeared" by different responses caused by illuminating light incident at different angles. In FIG. 3B, the bright spot in each superpixel is an indication of the specular reflection of that superpixel, which in turn can be used to estimate surface normal, strength of specular reflection, etc. FIG. 3A can be thought of as a large number of bright spots, each created by light incident at a different angle. As a result, the bright spots are shifted relative to each other. No individual bright spot is visible, nor is it clear which bright spots were generated by which incident rays.

A plenoptic camera is used to capture the angular information of the light reflected from the object surface. The object surface presents certain bidirectional reflectance distribution function (BRDF) property, which means the light reflected from the object's surface shows different intensities along different propagation directions. In a conventional camera, information about the propagation directions is lost. However, in a plenoptic camera, information about the propagation directions of the reflected beam is preserved. With point source illumination, each subpixel samples the BRDF characteristics of the object surface along a particular propagation direction.

Figure 4A:
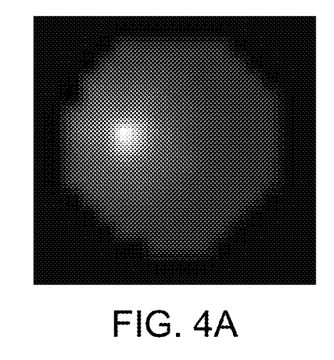
FIGS. 4A-4C show simulated superpixels for different surface orientations.
Figure 4B:
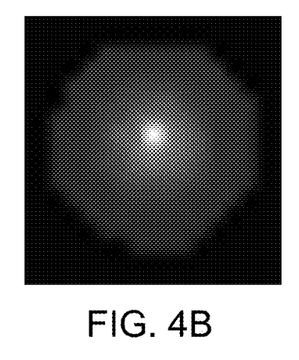
Figure 4C:
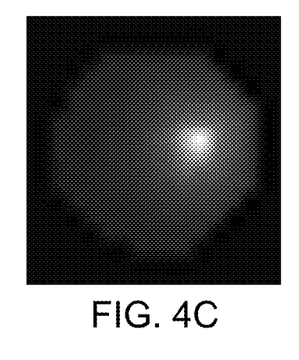
Figure 5A:
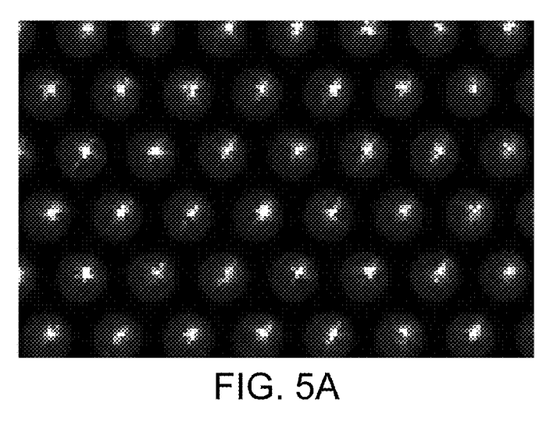
FIGS. 5A-5B show superpixels for different materials.
Figure 5B:
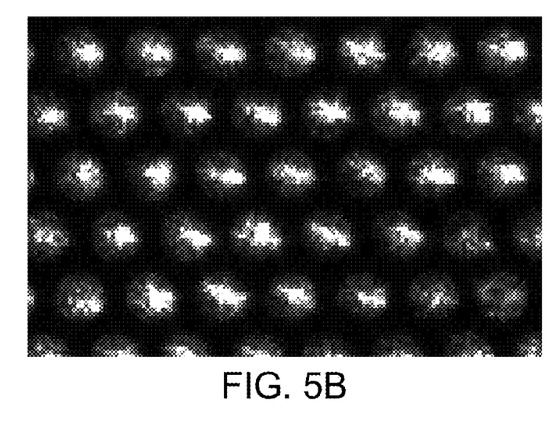

FIGS. 4-5 further explain this. The light captured by different subpixels within a superpixel depends on the orientation of the object's surface. FIGS. 4A-4C show simulated superpixels for different surface orientations (i.e., different surface normal). When the surface normal is rotated to different directions, the response of the superpixel also changes because the direction of the specular reflection changes. In this example, the bright spot's location within the superpixel is an indication of the specular reflection, which is an indication of the surface normal.

The response of the superpixel also depends on other parameters. FIGS. 5A-5B show superpixel responses to two different materials, both under collimated illumination. FIG. 5A is a plastic card. FIG. 5B is copper-nickel. The copper-nickel object causes a broader response than the plastic card.

In one approach, the system response is modeled by considering both the surface normals and the optical properties of the material. A Ward BRDF model is used, but other BRDF models can also be used. The Ward BRDF model is defined as $$f(n, 1, r_{i,m}) = \frac{\rho_d}{\pi} + \frac{\rho_s}{4\pi\beta^2\sqrt{\cos\theta_i\cos\theta_r}} e^{-(\tan\delta/\beta)^2} \quad (1)$$

Figure 6:
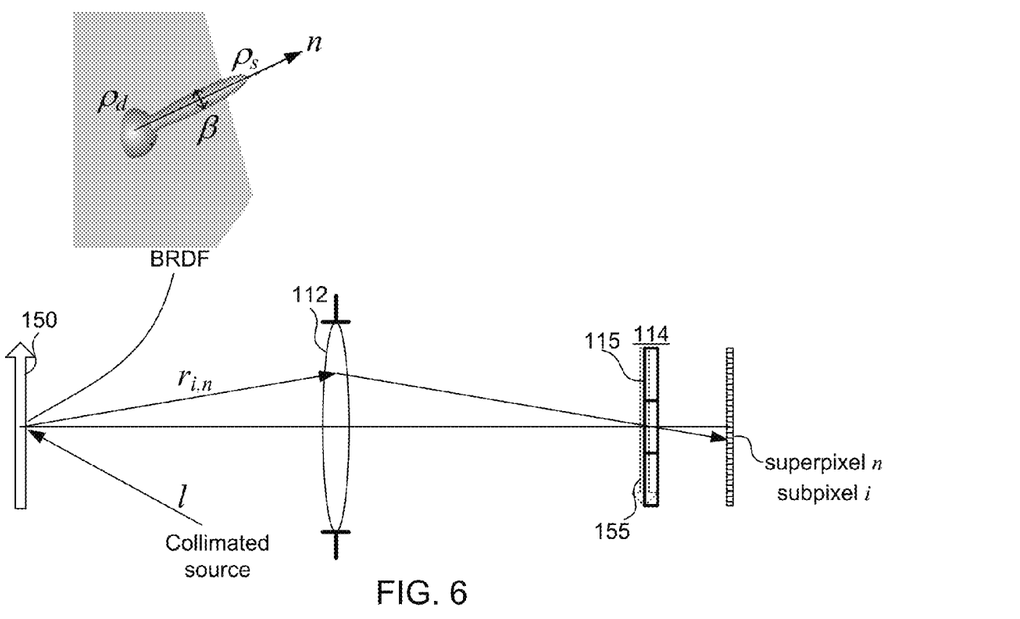
FIG. 6 is a diagram illustrating a Ward BRDF model.

As shown in FIG. 6, n and l are unit vectors of surface normal and illumination direction, $r_{i,m}$ is the unit vector of the light field viewing direction of the ith subpixel in the mth superpixel, $\rho_d$ and $\rho_s$ are diffuse and specular reflection coefficients, $\beta$ is the surface roughness, $\theta_i$ and $\theta_r$ are illumination and camera viewing zenith angles, and $\delta$ is the angle between n and the halfway vector h that is between illumination and viewing directions. In Eq (1) the n, l, $r_{i,m}$ vectors are not expressly presented. Rather, the $\theta_i$, $\theta_r$, and $\delta$ are calculated based on these vectors as given below $$\theta_i = \arccos(l \cdot n) \qquad (2)$$

$$\theta_r = \arccos(r_{i,m} \cdot n) \qquad (3)$$

$$h = \frac{1 + r_{i,m}}{\sqrt{|1 + r_{i,m}|}} \qquad (4)$$

$$\delta = \arccos(h \cdot n) \qquad (5)$$

In the Ward model the l, $r_{i,m}$ vectors are known based on the system configuration. The $\rho_d$, $\rho_s$, $\beta$, and n are unknown parameters. There are two degrees of freedom among the three components $n_x$, $n_y$ and $n_z$ in the surface normal vector n, yielding a total of five unknown parameters to be solved.

The $r_{i,m}$ vector encodes the directional information of the light field captured by the ith subpixel in the mth superpixel. It is the mapping of the light field to the detectors, as described previously. In certain designs, the $r_{i,m}$ vector is the same for all the superpixels. However, this is not always the case. In one approach, the mapping of the light field to the detectors is determined by calibration, which can account for different types of aberrations. In another approach, the mapping could be determined by system simulation.

If the object surface or part of the object surface is out of focus, this will introduce disparity between subpixels from different views and affect the mapping between the light field and the subpixels. Therefore, it can be desirable to optically or digitally refocus the camera to first eliminate this disparity as a pre-processing step before performing the optimization described below in Eq (6). To refocus the camera, begin by determining the disparity or depth of the object. The disparity or depth of the object can be measured manually, estimated based on computerized calculation or given as apriori knowledge of the images surface (e.g., a CAD model). To automatically calculate the disparity or depth, different methods can be used, such as based on parallax between different views, based on the sharpness of the image, etc. Once we obtain the disparity or depth about the object, we can use it to optically or digitally refocus the image to ensure that each superpixel collects the rays from the same object region. The surface to which we refocus is referred to as a reference surface, which will be later used for the height map estimation described below. In the case of a planar object, we obtain a reference plane based on this process. If the camera has certain distortion, field curvature or other aberrations, we can use the calibration to find a corresponding reference surface for a given optical system. Therefore, a reference surface can be object dependent, optical system dependent or a combination of those.

Each superpixel contains many subpixels and each subpixel has a different $r_{i,m}$ vector. Therefore, processing the subpixels is an approach where there are many data points to determine the BRDF. In one approach, solve for the unknowns in Eq (1) by using brute force. Non-linear optimization can also be used. One possible objective function is $$O_n(n, \rho_d, \rho_s, \beta) = \sum_i [I_{i,m} - (1 \cdot n) f(n, 1, r_{i,m})]^2 \qquad (6)$$

where $I_{i,m}$ is the measurement of the ith subpixel in the mth superpixel. This optimization process is repeated for all superpixels and yields surface normal, diffuse reflection coefficient, specular reflection coefficient and surface roughness. Another approach is to conduct segmentation or material classification first, and then estimate the surface parameters for each class.

Based on the estimated surface normal, a height map of the object's surface can be recovered. The height map is typically defined as the distance from points on the object's surface relative to a reference surface. To reconstruct the height map, one approach minimizes $$S(z) = \sum_{x,y} \left[ \left( n_z \frac{\partial z(x,y)}{\partial x} + n_x \right)^2 + \left( n_z \frac{\partial z(x,y)}{\partial y} + n_y \right)^2 \right] \qquad (7)$$

to obtain the height map z(x, y) at each pixel based on the estimated surface normal $n_x$, $n_y$, and $n_z$. Other methods to reconstruct the height map from surface normal can also be used, such as Fourier transform based approaches. A depth map can also be calculated by combining the depth of the reference surface and the estimated height map.

Figure 7:
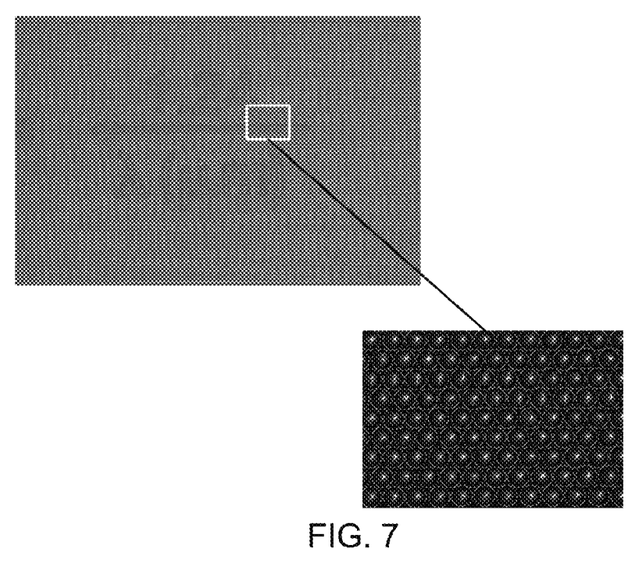
FIG. 7 shows a raw plenoptic image for a ruler card.
Figure 8A:
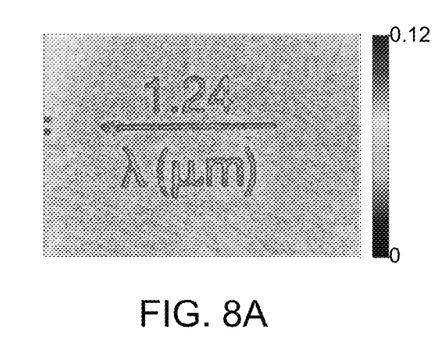
FIGS. 8A-8E are pseudocolor images of different properties of the ruler card.
Figure 8B:
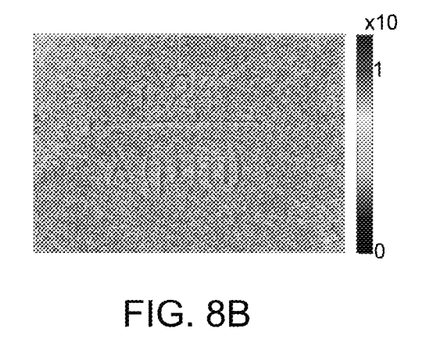
Figure 8C:
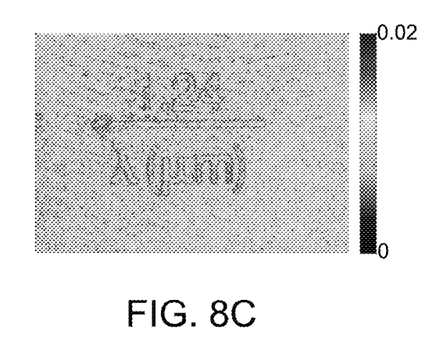
Figure 8D:
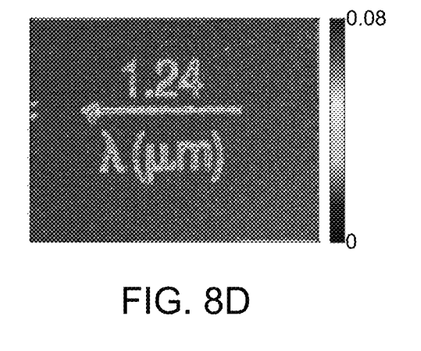
Figure 8E:
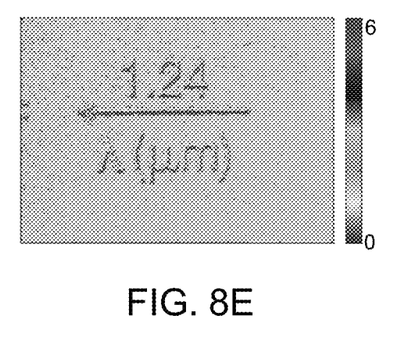
Figure 9A:
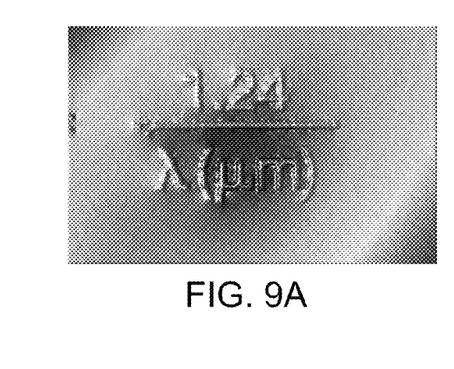
FIG. 9A is a pseudocolor height map of the ruler card.
Figure 9B:
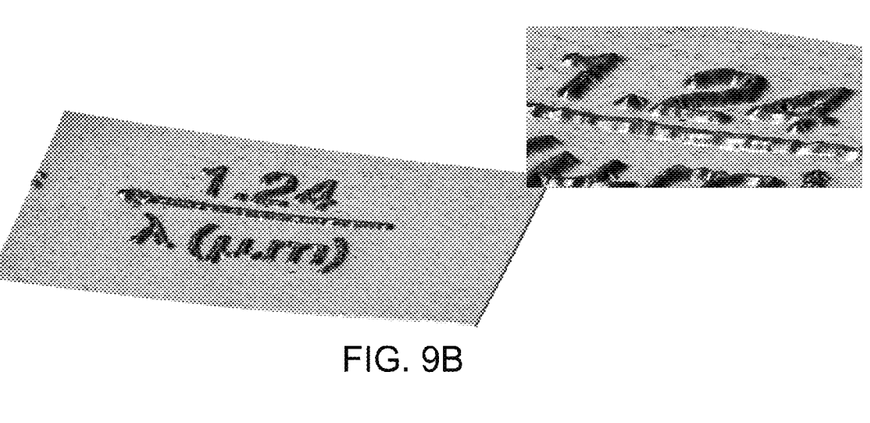
FIG. 9B is a three-dimensional rendering of the ruler card.

FIGS. 7-11 show some examples. FIGS. 7-9 are an example for a printed ruler card using ink that is roughly 5-10 microns thick as measured by a micrometer. The ruler card is illuminated on-axis. FIG. 7 shows the raw plenoptic image for the ruler card. The top image shows the entire plenoptic image. The bottom image is a magnification of the area within the rectangle in the top image. In the bottom image, each superpixel is circled for clarity. The bright spot caused by specular reflection can be seen.

FIGS. 8A-8E show different properties reconstructed from the plenoptic image of FIG. 7. Each of the images in FIG. 8 is approximately 12 mm×8 mm. FIGS. 8A-8C show the diffuse reflection coefficient $\rho_d$, the specular reflection coefficient $\rho_s$ and the surface roughness $\beta$, respectively. The surface normal vector $[n_x, n_y, n_z]$ is converted to polar coordinates and is represented using the zenith and azimuth angles $\theta_n$ and $\phi_n$, as shown in FIGS. 8D-8E, respectively. From these quantities, a height map of the card can be reconstructed, as shown in FIG. 9A. A three-dimensional rendering can also be created, as shown in FIG. 9B. Because both height and surface BRDF characteristics are known, it is possible to achieve realistic three-dimensional rendering. For example by changing the surface orientation or the illumination direction in a three-dimensional space, the reflection of the surface is also changed.

Figure 10A:
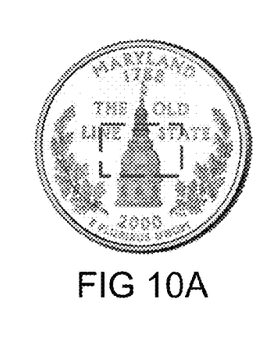
FIG. 10A is an image of a quarter.
Figure 10B:
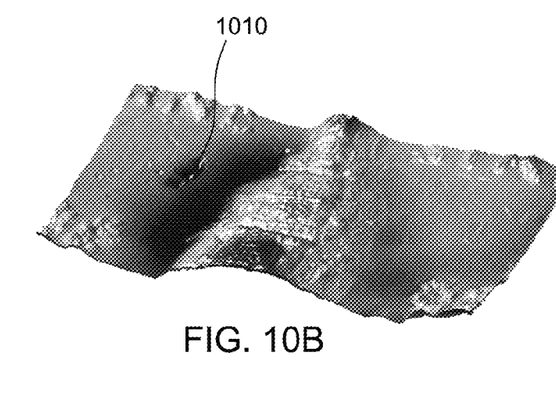
FIG. 10B is a corresponding pseudocolor height map.

FIG. 10A shows an example of a Maryland quarter, and FIG. 10B shows the corresponding reconstructed height map. Surface damage 1010 can be seen in the height map of FIG. 10B. This approach can be used for surface inspection applications.

Figure 11:
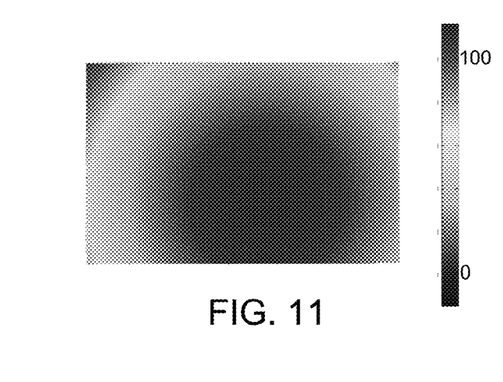
FIG. 11 is a pseudocolor height map of a concave mirror.

FIG. 11 is a reconstructed height map of a featureless concave mirror. The rectangular area shown is approximately 6 mm×4 mm. This shows that this approach can be used even when the object has no texture or features, or is dominated by specular reflection. The reconstruction has a mean surface normal error of approximately 0.11 degrees and a mean depth error of approximately 0.3 microns.

The examples described above use a single plenoptic image to reconstruct various surface properties. One advantage of this approach is that video can be processed, since each frame of the video is a single image that may be processed as described above. With this technique, surface properties of a moving object can be estimated.

Multiple plenoptic images can also be used. More plenoptic images yield more data points to solve the reconstruction problem. In one approach, multiple plenoptic images are captured sequentially in time. Each plenoptic image may correspond to different illumination conditions, for example collimated sources incident from different angles. In another approach, the different plenoptic images are spectrally coded or otherwise encoded. For example, red, green and blue collimated sources at different locations may simultaneously illuminate the object. The sensor array may have color filters over different sensors, for example a Bayer pattern. In this way, different illumination conditions can be captured simultaneously. Alternately, a spectrally coded aperture may be used in the plenoptic imaging system, since it is located at a conjugate to the sensor array.

Although the detailed description contains many specifics, these should not be construed as limiting the scope of the invention but merely as illustrating different examples and aspects. It should be appreciated that the scope of the invention includes other embodiments not discussed in detail above. For example, the techniques described above can also be combined with other methods for estimating depth. Plenoptic imaging systems can extract depth from disparities, for example. In one approach, the object may be illuminated using flatfield/room illumination and a plenoptic image of the object may be processed to obtain a rough depth estimate based on disparity. This can then be refined to finer resolution using the BRDF-based method described above, which uses point source/collimated illumination of the object. The two methods could be used iteratively given some depth resolution criterion. For example, first use the BRDF method. If no variation in depth is extracted, then switch to the disparity method. Then refocus to a certain depth plane and perform depth estimation via BRDF. Alternately, the disparity method could be used first. In addition, other types of refocusing could be combined with the BRDF method. Various other modifications, changes and variations which will be apparent to those skilled in the art may be made in the arrangement, operation and details of the method and apparatus of the present invention disclosed herein without departing from the spirit and scope of the invention as defined in the appended claims. Therefore, the scope of the invention should be determined by the appended claims and their legal equivalents.

In alternate embodiments, aspects of the invention are implemented in computer hardware, firmware, software, and/or combinations thereof. Apparatus can be implemented in a computer program product tangibly embodied in a non-transitory machine-readable storage device for execution by a programmable processor; and method steps can be performed by a programmable processor executing a program of instructions to perform functions by operating on input data and generating output. Embodiments can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits) and other forms of hardware.

What is claimed is:

1. A method implemented on a computer system for estimating surface properties of an object, the method comprising:
   accessing a plenoptic image of the object illuminated by a point source, the plenoptic image comprising a plurality of superpixels, each superpixel capturing light reflected from a certain region of the object, and each superpixel comprising a plurality of subpixels, each subpixel capturing light reflected over a certain range of propagation directions; and
   for a plurality of superpixels, processing the subpixels within the superpixel to estimate the surface properties for the region of the object corresponding to the superpixel, said processing based on the ranges of propagation directions captured by the subpixels.

2. The computer-implemented method of claim 1 wherein the surface properties include at least one of: surface normals for the different regions of the object, specular reflections for the different regions of the object, and surface roughnesses for the different regions of the object.

3. The computer-implemented method of claim 1 wherein processing the subpixels comprises processing the subpixels to estimate a bidirectional reflectance distribution function (BRDF) of the object.

4. The computer-implemented method of claim 1 wherein processing the subpixels comprises processing the subpixels using a mapping of regions and propagation directions from the object to corresponding subpixels.

5. The computer-implemented method of claim 4 wherein the mapping of regions and propagation directions from the object to corresponding subpixels depends on a geometry of the illumination by the point source, and both the geometry of the illumination and the mapping from the object to the subpixels are known before processing the subpixels.

6. The computer-implemented method of claim 4 further comprising:
   calibrating a plenoptic imaging system that captures the plenoptic image, to determine the mapping from the object to the subpixels.

7. The computer-implemented method of claim 1 wherein the point source is a collimated source.

8. The computer-implemented method of claim 1 further comprising:
   estimating a depth to a reference surface of the object, wherein estimating the surface properties of the object comprises estimating the surface properties of the object relative to the reference surface.

9. The computer-implemented method of claim 8 wherein estimating the depth to the reference surface of the object is based on an optical design of the plenoptic imaging system that captures the plenoptic image.

10. The computer-implemented method of claim 8 wherein estimating the depth to the reference surface of the object is based on processing the captured plenoptic image.

11. The computer-implemented method of claim 8 further comprising:
refocusing the plenoptic imaging system that captures the plenoptic image, to the estimated depth; and
capturing the plenoptic image of the object with the plenoptic imaging system refocused to the estimated depth.

12. The computer-implemented method of claim 1 wherein processing the subpixels comprises processing the subpixels from a single plenoptic image to estimate the surface properties of the object.

13. The computer-implemented method of claim 1 wherein:
accessing a plenoptic image comprises accessing a plurality of plenoptic images of the object illuminated by different point source geometries; and
processing the subpixels comprises processing the subpixels from the plurality of plenoptic images to estimate the surface properties of the object.

14. The computer-implemented method of claim 13 wherein the plurality of plenoptic images includes at least three plenoptic images and the surface properties include surface normals, specular reflections, surface roughnesses and diffuse reflections for the different regions of the object.

15. The computer-implemented method of claim 13 wherein the plurality of plenoptic images are spectrally coded and the plurality of plenoptic images are captured simultaneously.

16. The computer-implemented method of claim 1 further comprising:
generating a height map of the object from the plenoptic image and/or the estimated surface properties.

17. The computer-implemented method of claim 1 further comprising:
generating a three-dimensional rendering of the object from the plenoptic image and/or the estimated surface properties.

18. The computer-implemented method of claim 1 wherein:
accessing a plenoptic image comprises accessing a video with frames of plenoptic images captured sequentially in time; and
processing the subpixels comprises processing the subpixels to estimate surface properties for each frame of the video.

19. A system for estimating surface properties of an object, the system comprising:
a plenoptic imaging system that captures a plenoptic image of the object illuminated by a point source, the plenoptic image comprising a plurality of superpixels, each superpixel capturing light reflected from a certain region of the object, and each superpixel comprising a plurality of subpixels, each subpixel capturing light reflected over a certain range of propagation directions; and
a processor that, for a plurality of superpixels, processes the subpixels within the superpixel to estimate the surface properties for the region of the object corresponding to the superpixel, said processing based on the ranges of propagation directions captured by the subpixels.

20. A computer program product embedded in a non-transitory computer-readable medium for estimating surface properties of an object, the computer program product storing computer program code for performing a method, the method comprising:
accessing a plenoptic image of the object illuminated by a point source, the plenoptic image comprising a plurality of superpixels, each superpixel capturing light reflected from a certain region of the object, and each superpixel comprising a plurality of subpixels, each subpixel capturing light reflected over a certain range of propagation directions; and
for a plurality of superpixels, processing the subpixels within the superpixel to estimate the surface properties for the region of the object corresponding to the superpixel, said processing based on the ranges of propagation directions captured by the subpixels.

* * * * *